US012793382B2

(12) United States Patent
Qin

(10) Patent No.: US 12,793,382 B2
(45) Date of Patent: Nov. 10, 2026

(54) IMAGE MATCHING USING DUAL INTENSITY AND TEXTURE METRICS

(71) Applicant: SAMSUNG ELECTRONICS CO., LTD., Suwon-si (KR)

(72) Inventor: Fang Qin, Suzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 276 days.

(21) Appl. No.: 18/521,412

(22) Filed: Nov. 28, 2023

(65) Prior Publication Data

US 2025/0069363 A1 Feb. 27, 2025

(30) Foreign Application Priority Data

Aug. 24, 2023 (CN) ......................... 202311071577.7

(51) Int. Cl.
*G06V 10/75* (2022.01)
*G06T 7/231* (2017.01)

(52) U.S. Cl.
CPC ............ *G06V 10/751* (2022.01); *G06T 7/231* (2017.01)

(58) Field of Classification Search
None
See application file for complete search history.

(56) References Cited

U.S. PATENT DOCUMENTS 11,222,229 B1 * 1/2022 Picardo ................... G06T 7/593
2006/0029272 A1 * 2/2006 Ogawa ...................... G06T 7/32 348/E13.067
2010/0142828 A1 * 6/2010 Chang ..................... G06T 7/593 382/209
2018/0007384 A1 * 1/2018 Huang ................... H04N 19/56
2022/0284071 A1 * 9/2022 Denninghoff ....... G06F 16/9577
2023/0401274 A1 * 12/2023 Denninghoff ....... G06F 16/9577
2025/0069363 A1 * 2/2025 Qin ......................... G06T 7/231

OTHER PUBLICATIONS

Yaakob, et al, "A Comparison of Different Block Matching Algorithms for Motion Estimation", In The 4th International Conference on Electrical Engineering and Informatics (ICEEI 2013), 7 pages.

(Continued)

*Primary Examiner* — Tahmina N Ansari

(74) *Attorney, Agent, or Firm* — Morgan, Lewis & Bockius LLP

(57) ABSTRACT

A method of image matching and an image processing device are disclosed. The method comprises: obtaining a reference image and an image to be matched; determining a template image block in the reference image, wherein the template image block is an image block located in a matching window in the reference image; determining a first image block in the image to be matched, wherein the first image block is an image block in the image to be matched having a smallest sum of an absolute difference (SAD) with the template image block; determining a second image block in the image to be matched, wherein the second image block is an image block in the image to be matched having a smallest gradient information difference with the template image block; and determining a matching image block in the image to be matched based on the first image block and the second image block.

16 Claims, 10 Drawing Sheets

(56) References Cited

OTHER PUBLICATIONS

Santamaria, et al, "A Comparison of Block-Matching Motion Estimation Algorithms", In 2012 7th Columbian Computing Congress (CCC), Dec. 31, 2012, DOI: 10.1109/COLOMBIANCC.2012.6398002, 7 pages.
Wu, Jiawei et al., "Combining Gray Level and Gradient Magnitude for Scene Matching," Proc. of SPIE vol. 7495 (2009) 74952P-1-74952P-8.
Singh, Satbir et al., "Object Tracking with a Novel Visual-Thermal Sensor Fusion Method in Template Matching," I.J. Image, Graphics and Signal Processing, 2019, 7, 39-47.
1st Office Action issued Dec. 5, 2025 in corresponding Chinese Patent Application No. 202311071577.7.
A.V., Paramkusam et al., "All Directional Search Motion Estimation Algorithm," Electronics 2022, 11, 3736.
Second Office Action issued Jun. 24, 2026 in corresponding Chinese Patent Application No. 202311071577.7.

* cited by examiner

IMAGE MATCHING USING DUAL INTENSITY AND TEXTURE METRICS

CROSS-REFERENCE TO RELATED APPLICATION

This application is based on and claims priority to Chinese Patent Application No. 202311071577.7 filed on Aug. 24, 2023 in the World Intellectual Property Organization, and the benefits accruing therefrom under 35 U.S.C. § 119, the contents of which are incorporated by reference herein in their entirety.

BACKGROUND

The following generally relates to digital image processing, and more particularly, to a method of image matching using an image processing device. Digital image processing refers to the use of a computer to edit a digital image using an algorithm or a processing network. In some cases, image processing software may be used for various image processing tasks, such as image editing, image generation, etc.

Image matching is a subfield of image processing, and may include a preliminary screening (for example, target detection) of multi-level processing. However, conventional image matching methods are influenced by illumination, occlusion, noise and the like. Additionally, conventional methods have low robustness and may not be able to accurately match images. Therefore, there is a need in the art for a robust image matching method with improved accuracy.

SUMMARY

The summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

The present disclosure describes systems and methods for image processing. Embodiments of the disclosure include a method of image matching. In some cases, the image matching method comprises obtaining a reference image and an image to be matched followed by determining a template image block in the reference image, wherein the template image block is an image block located in a matching window in the reference image. Further, the method includes determining a first image block in the image to be matched, wherein the first image block is an image block in the image to be matched having a smallest sum of an absolute difference (SAD) with the template image block followed by determining a second image block in the image to be matched, wherein the second image block is an image block in the image to be matched having a smallest gradient information difference with the template image block and finally determining a matching image block in the image to be matched based on the first image block and the second image block.

The determining of the second image block may comprise determining gradient information for the template image blocks and each of K image blocks associated with the first image block, respectively, wherein the gradient information comprises a main direction of the image block and a gradient value in the main direction, and wherein K is an integer greater than 1. Additionally, the second image block may be determined based on comparing the gradient information of each of the K image blocks with that of the template image block, respectively and determining, as the second image block, an image block having a same main direction as the template image block and for which the gradient value in the main direction has a smallest difference with the gradient value in the main direction of the template image block among the K image blocks.

The main direction of the image block may comprise a direction of a maximum gradient value among gradient values in a plurality of directions.

The K image blocks comprise a set of K top image blocks among a set of image blocks overlapping the first image block, wherein the K image blocks are sorted in ascending order of the SAD with the template image block, and wherein the set of image blocks overlapping the first image block are obtained by sliding the matching window across the first image block.

The method of determining the matching image block may comprise determining the first image block or the second image block as the matching image block based on the first image block and the second image block being a same image block. Further, the method includes determining a position of the matching image block based on a position of the first image block, a position of the second image block, and a gradient difference change rate, the first image block and the second image block being different image blocks.

According to some embodiments, the matching image block may be closer to the second image block as the gradient difference change rate increases. According to some embodiments, the matching image block may be closer to the first image block as the gradient difference change rate decreases. In some cases, the first image block may be determined as the matching image block when the gradient difference change rate is less than a predetermined threshold.

The position of the matching image block may be determined based on a weighted sum of the position of the first image block and the position of the second image block. In some cases, weights used in calculation of the weighted sum are associated with the gradient difference change rate.

As the gradient difference change rate increases, a weight corresponding to the position of the first image block may be smaller than the second image block, and a weight corresponding to the position of the second image block may be greater than the first image block.

The method of determining the gradient difference change rate may comprise calculating a difference between gradient values in the main direction of the template image block for a pair of image blocks from among the K image blocks and the first image block. Additionally, the method includes calculating the gradient difference change rate based on a maximum and a minimum of the calculated differences between the gradient values.

The method of determining the first image block may comprise calculating the SAD values between the template image block and a part of image blocks in the image to be matched (i.e., partial image blocks), wherein a center of the partial image blocks is located in a search region in the image to be matched. In some cases, the search region is associated with a position of the template image block in the reference image.

The method of determining the first image block may comprise determining the search region from the image to be matched followed by determining the first image block based on a local minimum SAD of each of a plurality of sub-regions in the search region, wherein the local minimum SAD of each of the plurality of sub-regions is a minimum of the SAD values between image blocks having centers located in each of the plurality of sub-regions and the template image block, respectively.

The method of determining the first image block based on the local minimum SAD of each of the sub-regions in the search region may comprise calculating the local minimum SAD of each of the plurality of sub-regions and then determining a global minimum SAD based on the local minimum SADs, wherein the global minimum SAD is a minimum among the local minimum SADs. Moreover, the method includes determining whether a sub-region comprising the global minimum SAD is an outermost sub-region among the plurality of sub-regions in a current search region followed by determining an image block corresponding to the global minimum SAD as the first image block when the sub-region comprising the global minimum SAD is not the outermost sub-region.

The method may further comprise updating the search region when the sub-region comprising the global minimum SAD is the outermost sub-region and then determining the first image block. In some cases, the first image block is determined based on the local minimum SAD of each of the plurality of sub-regions in the search region based on the updating, wherein the updated search region further comprises an expansion region which is a sub-region located outside and surrounding the outermost sub-region.

The method may further comprise determining an image block that has a center located in the outermost sub-region and that reaches a boundary of the image to be matched before updating the search region. Additionally, the method comprises determining the image block corresponding to the global minimum SAD as the first image block in response to at least one image block which has the center located in the outermost sub-region and reaches a boundary of the image to be matched.

The determined search region may comprise a plurality of sub-regions sequentially embedded from inside to outside. In some cases, a first sub-region, which is innermost among the plurality of sub-regions, is located in a region in the image to be matched corresponding to the position of the template image block in the reference image and a size of the first sub-region is same as that of the matching window.

According to some embodiments of the present disclosure, an image processing device comprises a memory and a processor configured to: obtain a reference image and an image to be matched; determine a template image block in the reference image, wherein the template image block is an image block located in a matching window in the reference image; determine a first image block in the image to be matched, wherein the first image block is an image block from the image to be matched having a smallest sum of an absolute difference (SAD) with the template image block; determine a second image block in the image to be matched, wherein the second image block is an image block from the image to be matched having a smallest gradient information difference with the template image block; and determine a matching image block in the image to be matched based on the first image block and the second image block.

According to some embodiments, the processor may be configured to: determine gradient information for the template image block and each of K image blocks associated with the first image block, respectively, wherein the gradient information comprises a main direction of the image block and a gradient value in the main direction, and wherein K is an integer greater than 1; compare the gradient information of each of the K image blocks with that of the template image block, respectively; and determine as the second image block an image block having a same main direction as the template image block and for which the gradient value in the main direction has a smallest difference with the gradient value in the main direction of the template image block, among the K image blocks.

In some examples, the main direction of the image block may be a direction in which a maximum gradient value among gradient values in a plurality of directions of the image block exists.

The K image blocks comprise a set of K top image blocks, among a set of image blocks overlapping the first image block, wherein the K image blocks are sorted in ascending order of the SAD with the template image block, and wherein the image blocks overlapping the first image block are obtained by sliding the matching window across the first image block.

According to some embodiments, the processor may be configured to: determine the first image block or the second image block as the matching image block based on the first image block and the second image block being a same image block. Further, the processor may determine a position of the matching image block based on a position of the first image block, a position of the second image block, and a gradient difference change rate, the first image block and the second image block being different image blocks.

In some examples, the matching image block may be closer to the second image block than the first image block as the gradient difference change rate increases. Additionally, the matching image block may be closer to the first image block than the second image block as the gradient difference change rate decreases. In some cases, the first image block may be determined as the matching image block when the gradient difference change rate is less than a predetermined threshold.

The position of the matching image block may be determined based on a weighted sum of the position of the first image block and the position of the second image block. Moreover, weights used in calculation of the weighted sum are associated with the gradient difference change rate.

As the gradient difference change rate increases, a weight corresponding to the position of the first image block may be smaller than a weight corresponding to the position of the second image block. Similarly, a weight corresponding to the position of the second image block may be greater than a weight corresponding to the position of the first image block.

According to some embodiments, the processor may be configured to: calculate a difference between gradient values in the main direction of the template image block for a pair of image blocks from among the K image blocks and the first image block. Further, the processor is configured to calculate the gradient difference change rate based on a maximum and a minimum of the calculated differences between the gradient values.

The processor may be configured to: determine the first image block by calculating the SAD values between the template image block and a part of image blocks in the image to be matched (i.e., partial image blocks), wherein a center of the partial image blocks are located in a search region in the image to be matched. In some cases, the search region is associated with a position of the template image block in the reference image.

The processor may be configured to: determine the search region from the image to be matched; determine the first image block based on a local minimum SAD of each of a plurality of sub-regions in the search region, wherein the local minimum SAD of each of the plurality of sub-regions is a minimum of the SAD values between image blocks having centers located in each of the plurality of sub-regions and the template image block, respectively.

According to some embodiments, the processor may be configured to: calculate the local minimum SAD of each of the plurality of sub-regions; determine a global minimum SAD based on the local minimum SADs, wherein the global minimum SAD is a minimum among the local minimum SADs; determine whether a sub-region comprising the global minimum SAD, is an outermost sub-region among the plurality of sub-regions in a current search region. Additionally, the processor may determine an image block corresponding to the global minimum SAD as the first image block when the sub-region comprising the global minimum SAD is not the outermost sub-region.

According to some embodiments, the processor may be further configured to: update the search region when the sub-region comprising the global minimum SAD is the outermost sub-region, and then determine the first image block based on the local minimum SAD of each of the plurality of sub-regions in the search region based on the updating, wherein the updated search region further comprises an expansion region which is a sub-region. In some examples, the expansion region is located outside and surrounding the outermost sub-region.

According to some embodiments, the processor may be further configured to: determine an image block which has a center located in the outermost sub-region and that reaches a boundary of the image to be matched before updating the search region, and determine the image block corresponding to the global minimum SAD as the first image block in response to at least one image block which has the center located in the outermost sub-region and reaches a boundary of the image to be matched.

The determined search region may comprise a plurality of sub-regions sequentially embedded from inside to outside. In some cases, a first sub-region, which is innermost among the plurality of sub-regions, is located in a region in the image to be matched corresponding to the position of the template image block in the reference image and a size of the first sub-region is same as that of the matching window.

According to some example embodiments, a non-transitory computer-readable storage medium stores instructions that, when executed by a processor, cause the processor to execute the method disclosed above.

The image matching method and image processing device according to the embodiments of the present disclosure may consider SAD information and texture information (e.g., gradient information) when performing image matching. By considering both the SAD information and the texture information, embodiments of the present disclosure can prevent influence of noise, illumination, occlusion, and the like on image matching, while improving accuracy, robustness, and real-time performance on image matching. In addition, by calculating SAD values in different regions, the search process may be accelerated, redundant calculations may be reduced, and the real-time performance of image matching may be improved.

Other aspects and/or advantages of inventive concepts will be described in the following description, and will be clear through the description and/or may be learned through the practice of various example embodiments and the claims.

BRIEF DESCRIPTION OF THE DRAWINGS

The above and other objects, features and advantages of the present disclosure will become clear through the following detailed description together with the accompanying drawings.

DETAILED DESCRIPTION OF EXAMPLE EMBODIMENTS

Figure 1:
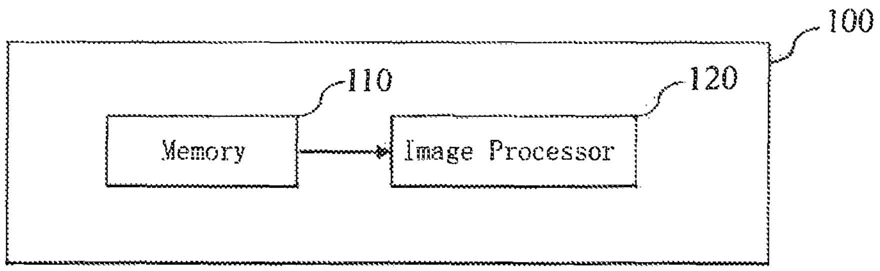
FIG. 1 is a block diagram illustrating an electronic device according to some example embodiments.

The present disclosure describes systems and methods for image processing. Embodiments of the disclosure include a method of image matching. In some cases, the image matching method comprises obtaining a reference image and an image to be matched, and determining a template image block in the reference image. In some cases, the template image block is an image block located in a matching window in the reference image. According to some embodiments, the image matching method includes determining a first image block using a smallest sum of an absolute difference (SAD) and determining a second image block having a smallest gradient information difference with the template image block in the image. In some cases, the matching image block in the image to be matched is finally determined based on the first and second image blocks.

Conventional methods of image matching may search for image blocks in the image to be matched based on the SAD between the image block and the template image block. However, such methods may perform the search by scanning the entire image to be matched. In some cases, the image processor of the conventional systems may calculate the SAD between each image block and the template image block by scanning the entire image to search for a matching image block. As such, conventional methods may use significant computational resources and have reduced speed for image matching processing.

Accordingly, embodiments of the present disclosure include systems and methods for image matching based on a correlation between the reference image and the image to be matched. In some cases, the image processor, as described with reference to the present disclosure, may determine a first image block by calculating SAD values between the image blocks in a partial area of the image to be matched and the template image block.

According to some embodiments, the image processor, as described with reference to the present disclosure, may also determine a second image block by calculating the texture information (or gradient information) between the image blocks in a partial area of the image to be matched and the template image block. Finally, the image processor determines a matching image block in the image to be matched based on the first image block and the second image block.

Embodiments of the present disclosure include a method for image matching. The method includes obtaining a reference image and an image to be matched followed by determining a template image block in the reference image. In some cases, the template image block is an image block located in a matching window in the reference image. Further, the image processor determines a first image block and a second image block in the image to be matched. For example, the first image block is an image block from the image to be matched having a smallest sum of an absolute difference (SAD) with the template image block. For example, the second image block is an image block from the image to be matched having a smallest gradient information difference with the template image block. Finally, the image processor determines a matching image block in the image to be matched based on the first image block and the second image block.

Accordingly, by calculating the SAD between the image blocks in a partial area of the image to be matched and the template image block, embodiments of the present disclosure are able to reduce the computational resources and improve the speed of the image matching process. Moreover, by simultaneously considering the SAD information and the texture information, embodiments of the present disclosure can reduce influence of noise, illumination, occlusion, etc. Thus, the accuracy, robustness, and real-time performance of image matching system can be improved.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed herein are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

The present disclosure may be modified in multiple alternate forms, and thus specific embodiments will be exemplified in the drawings and described in detail. It will be understood that when a component is referred to as being "connected to" another component, the component may be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising." when used in this specification, specify the presence of stated features, integers, steps, operations, elements, components or a combination thereof, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c", "at least one of a, b, and c," and "at least one selected from the group consisting of a, b, and c" indicates only a, only b, only c, both a and b, both a and c, both b and c, all of a, b, and c, or variations thereof.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings, wherein a method of image matching is described. Regarding the reference numerals assigned to the elements in the drawings, it should be noted that the same elements will be designated by the same reference numerals, and redundant descriptions thereof will be omitted.

FIG. 1 is a block diagram illustrating an electronic device according to some example embodiments.

The electronic device according to various example embodiments of the present disclosure may include or may be, for example, at least one of mobile phone, tablet personal computer (PC), personal digital assistant (PDA), portable multimedia player (PMP), augmented reality (AR) device, virtual reality (VR) device, various wearable devices (e.g. smart watch, smart glasses, smart bracelet, etc.). However, example embodiments are not limited thereto, and the electronic device according to inventive concepts may be any electronic device having an image processing function.

As shown in FIG. 1, the electronic device 100 according to some example embodiments at least includes a memory 110 and an image processor 120. In addition, the electronic device 100 may further include an image sensor.

The memory 110 may obtain an image externally or receive an image captured by an image sensor. The memory 110 may store images required to perform an image matching task. For example, the memory 110 may store a reference image and an image to be matched.

Memory 110 includes instructions executable by a processor. Examples of memory 110 include random access memory (RAM), read-only memory (ROM), or a hard disk. Examples of memory 110 include solid state memory and a hard disk drive. In some examples, memory 110 is used to store computer-readable, computer-executable software including instructions that, when executed, cause a processor to perform various functions described herein. In some cases, memory 110 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Additionally, the memory may store data and/or software or instructions for implementing a method of image matching according to some example embodiments. According to some example embodiments of the present disclosure, when the image processor 120 executes the software or instructions, the method of image matching may be implemented. According to some embodiments, the memory may be implemented either as a part of the image processor 120 or separately from the image processor 120 within the electronic device 100.

The image processor 120 may process images to perform image matching tasks. Generally, image matching processing is performed in units of image blocks. For example, for purpose of target detection, the image processor 120 may search for, in the image to be matched, a target image block corresponding (e.g., most similar) to the template image block in the reference image (e.g., the image block containing an object in the reference image), based on the template image block.

The image processor 120 may obtain a reference image and an image to be matched; determine first and second image blocks in the image to be matched based on template image block in the reference image. Further, image processor 120 may determine a matching image block in the image to be matched based on the first and second image blocks, wherein the template image block is an image block located in a matching window in the reference image. In some cases, the first image block is an image block having a smallest value of the sum of an absolute difference (SAD) with the template image block in the image to be matched (i.e., the SAD between the first image block and the template image block is the smallest). In some cases, the second image block is an image block having a smallest gradient information difference with the template image block in the image to be matched (i.e., the gradient information difference between the second image block and the template image block is the smallest).

The sum of absolute differences (SAD) refers to a measure of the similarity between image blocks. In some cases, the SAD is calculated based on the absolute difference between each pixel in the original block and the corresponding pixel in the block being used for comparison. The differences are combined (e.g., summed up) to create a metric of block similarity, the L1 norm of the difference image or a Manhattan distance between two image blocks. According to some examples, the SAD may be used for tasks such as object recognition, generation of disparity maps for stereo images, motion estimation for video compression, etc.

A Manhattan distance refers to a distance between two points which is the sum of the absolute differences of their Cartesian coordinates. For example, the Manhattan distance is the sum of the absolute values of the differences in both coordinates.

The image processor 120 may be implemented as general-purpose processor, application processor (AP), integrated circuit dedicated to image processing, field programmable gate array, or a combination of hardware and software. Processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor is configured to operate a memory array using a memory controller. In other cases, a memory controller is integrated into processor. In some cases, processor is configured to execute computer-readable instructions stored in a memory to perform various functions. In some embodiments, processor includes special purpose components for modem processing, baseband processing, digital signal processing, or transmission processing.

The method of image matching according to some example embodiments is described below with reference to FIG. 2.

Figure 2:
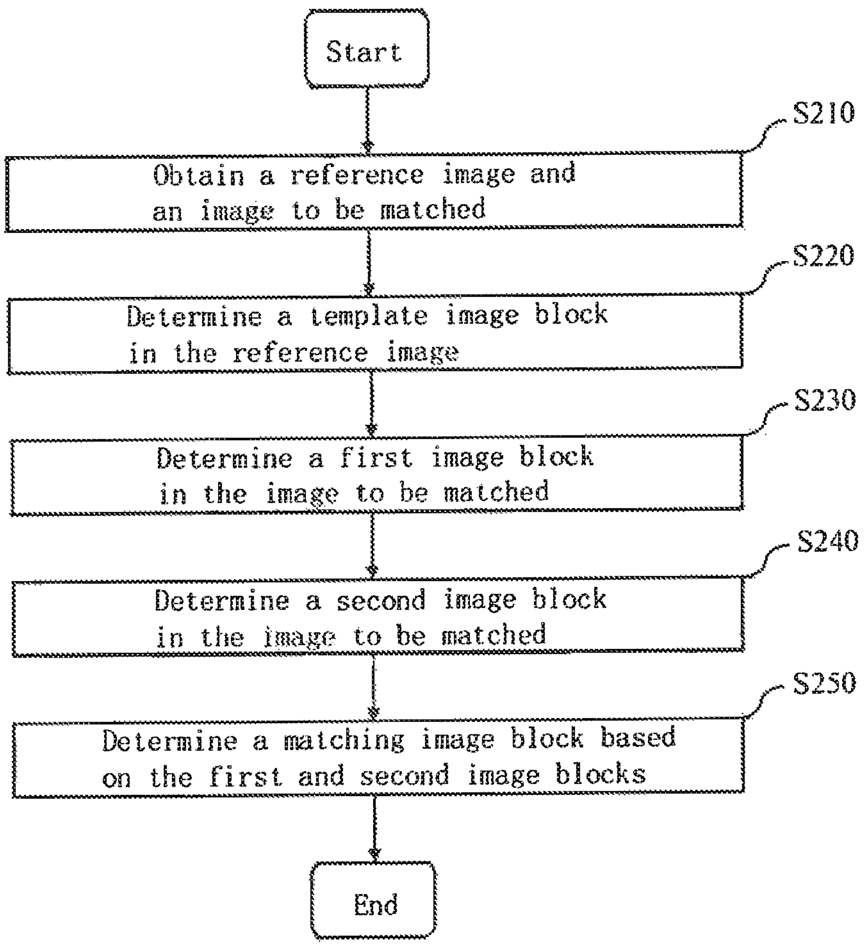
FIG. 2 is a flowchart illustrating a method of image matching according to some example embodiments.

FIG. 2 is a flowchart illustrating a method of image matching according to some example embodiments. FIG. 2 illustrates various steps. However, an order of the steps is not necessarily limited to the order illustrated in FIG. 2 and according to some embodiments, the steps may be performed in a different order than shown in FIG. 2.

Referring to FIG. 2, in step S210, the image processor 120 obtains the reference image and the image to be matched. For example, the image processor 120 may obtain, from the memory 110 or an image sensor or externally to the electronic device 100, the reference image and the image to be matched used for an image matching task.

In step S220, the image processor 120 determines the template image block in the reference image, wherein the template image block is an image block located within a matching window in the reference image. For example, in the image matching task for target detection, the template image block may be an image block containing a target or an object in the reference image.

In step S230, the image processor 120 determines a first image block P in the image to be matched, wherein the first image block P is an image block having a smallest SAD with the template image block in the image to be matched (i.e., the SAD between the first image block P and the template image block is the smallest). In some cases, the first image block P is a candidate image block obtained based on the SAD information.

The first image block P may be searched by using traditional SAD method, which scans the entire image to be matched. For example, the image processor 120 may obtain, from the image to be matched, a plurality of image blocks with the same size as the matching window, by a sliding window operation. The image processor 120 may calculate SADs between each image block and the template image block by scanning the entire image to be matched so as to search for the first image block P.

In some example embodiments, considering a correlation between the reference image and the image to be matched (for example, there is little difference in position of target between two adjacent frames of images), the image processor 120 may also determine the first image block P by calculating SAD between the image blocks in a partial area of the image to be matched and the template image block, thereby reducing the calculation amount and improving the speed of image matching processing.

According to example embodiments of the present disclosure, the process of determining the first image block P will be described in detail with reference to FIGS. 3 and 4.

In step S240, the image processor 120 determines a second image block G in the image to be matched, wherein the second image block G is an image block having a smallest gradient information difference with the template image block in the image to be matched (i.e. the gradient information difference between the second image block G and the template image block is the smallest). In some cases, the second image block G is a candidate image block obtained based on the texture information.

According to some example embodiments, the image processor 120 may obtain gradient information of the image blocks through a plurality of convolution kernels and determine the second image block G based on the comparison of the gradient information. However, the present disclosure is not limited thereto and any other algorithm may be used to obtain gradient information of the image blocks. The process of determining the second image block G will be described in detail with reference to FIGS. 6 and 7.

In step S250, the image processor 120 determines a matching image block T in the image to be matched based on the first image block P and the second image block G. The process of determining the matching image block T will be described in detail with reference to FIGS. 8 and 9.

According to example embodiments of the present disclosure, the image matching method may simultaneously consider SAD information and texture information (e.g., gradient information) and correct a position of the matched image block T. By simultaneously considering SAD information and texture information, embodiments of the present disclosure can reduce influence of noise, illumination, occlusion and the like, and improve the accuracy, robustness, and real-time performance of image matching.

Although the first image block P may be determined through SAD method which scans the entire image to be matched, it would take more computing resources and time. Therefore, a positional correlation is considered between the template image block in the reference image and the matching image block in the image to be matched. Accordingly, the first image block P may be determined by calculating the SADs between a part of image blocks in the image to be matched (i.e., partial image blocks) and the template image block, and thus reducing the computation and improving the processing speed for image matching.

Figure 3:
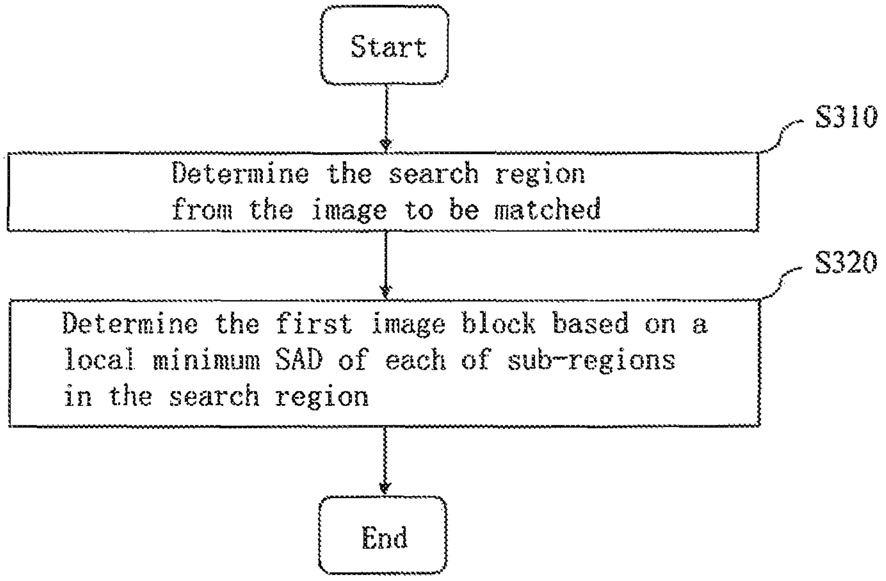
FIGS. 3 and 4 illustrate flowcharts of determining a first image block according to some example embodiments.

FIG. 3 illustrates a flowchart of determining the first image block P of a part of image blocks based on SAD calculation. Although FIG. 3 illustrates various steps, an order of the steps is not necessarily limited to the order illustrated in FIG. 3.

Referring to FIG. 3, in step S310, a search region may be determined from the image to be matched. The determined search region may include a plurality of sub-regions.

Since a size of an image block is the same as that of the matching window, the image block may be located by defining a position of a center of the image block. The centers of the image blocks to be used for SAD calculation may be located in the search region.

According to an embodiment, the search region determined in step S310 may include a plurality of sub-regions sequentially embedded from inside to outside. In this case, the plurality of sub-regions are arranged from the inside to the outside, and outer sub-regions surround inner sub-regions.

Figure 5:
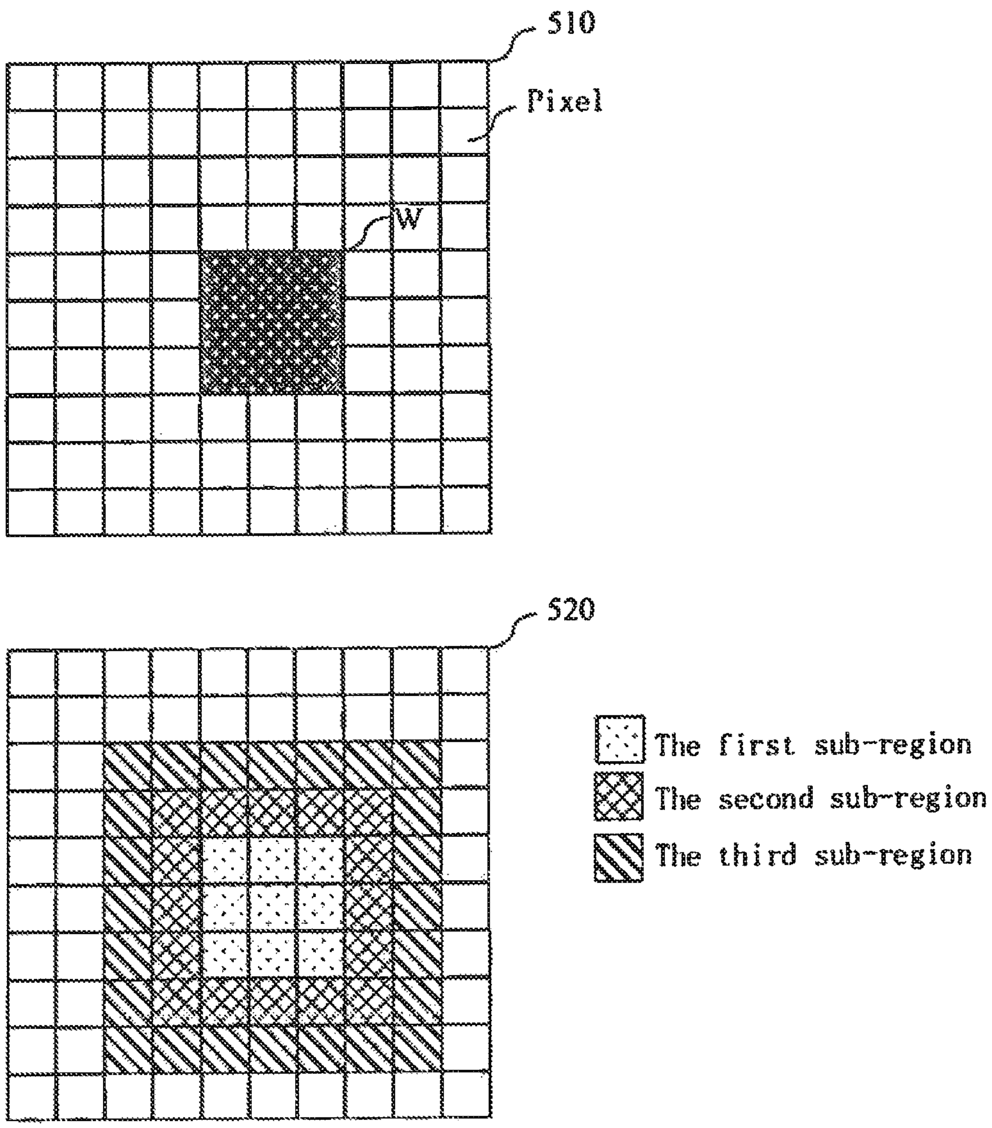
FIG. 5 is diagram illustrating a search region according to some example embodiments.

FIG. 5 is diagram illustrating determining the search region according to some example embodiments.

Referring to FIG. 5, a reference image 510 and an image to be matched 520 each include a plurality of pixels or pixel blocks. Assuming that a size of a matching window W in 510 is 3×3 pixels. In some cases, the template image block refers to an image block having a size of 3×3 located in the matching window W in the reference image 510. The size of the matching window W in FIG. 5 is an example, and the present disclosure is not limited thereto. The size of the matching window may be arbitrary depending on requirements of the image matching task.

The search region may be determined based on the position of the template image block in the reference image 510. Referring to FIG. 5, in the image to be matched 520, the search region may include a first sub-region, a second sub-region, and a third sub-region, wherein the first sub-region may be located in a region in the image to be matched 520 corresponding to a position of the template image block in the reference image 510. Additionally, a size of the first sub-region may be same as that of the matching window W. For example, referring to FIG. 5, the size of the first sub-region may be 3×3 pixels.

The second sub-region may be determined by expanding outward from the first sub-region. Similarly, the third sub-region may be determined by expanding outward from the second sub-region. Referring to FIG. 5, the second sub-region is located outside the first sub-region and surrounds the first sub-region. Similarly, the third sub-region is located outside the second sub-region and surrounds the second sub-region. According to the example in FIG. 5, the second sub-region includes an annular region comprising 16 pixels and the third sub-region includes an annular region comprising 24 pixels.

FIG. 5 illustrates that the determined search region includes three sub-regions. However, this is only an example and the present disclosure is not limited thereto. According to some example embodiments, the determined search region may include two sub-regions or more than three sub-regions.

Additionally, FIG. 5 illustrates that a stride of expanding outward from the first sub-region for obtaining the second sub-region is 1 pixel. However, this is only an example and the present disclosure is not limited thereto. The stride of expanding outward from the first sub-region for obtaining the second sub-region or expanding outward from any sub-region for obtaining another sub-region may be arbitrarily defined.

Referring again to FIG. 3, in step S320, the first image block P may be determined based on the local minimum SAD of each sub-region in the search region to avoid falling into local optimization when determining the first image block P by calculating SADs of a part of image blocks (with the template image block).

Figure 4:
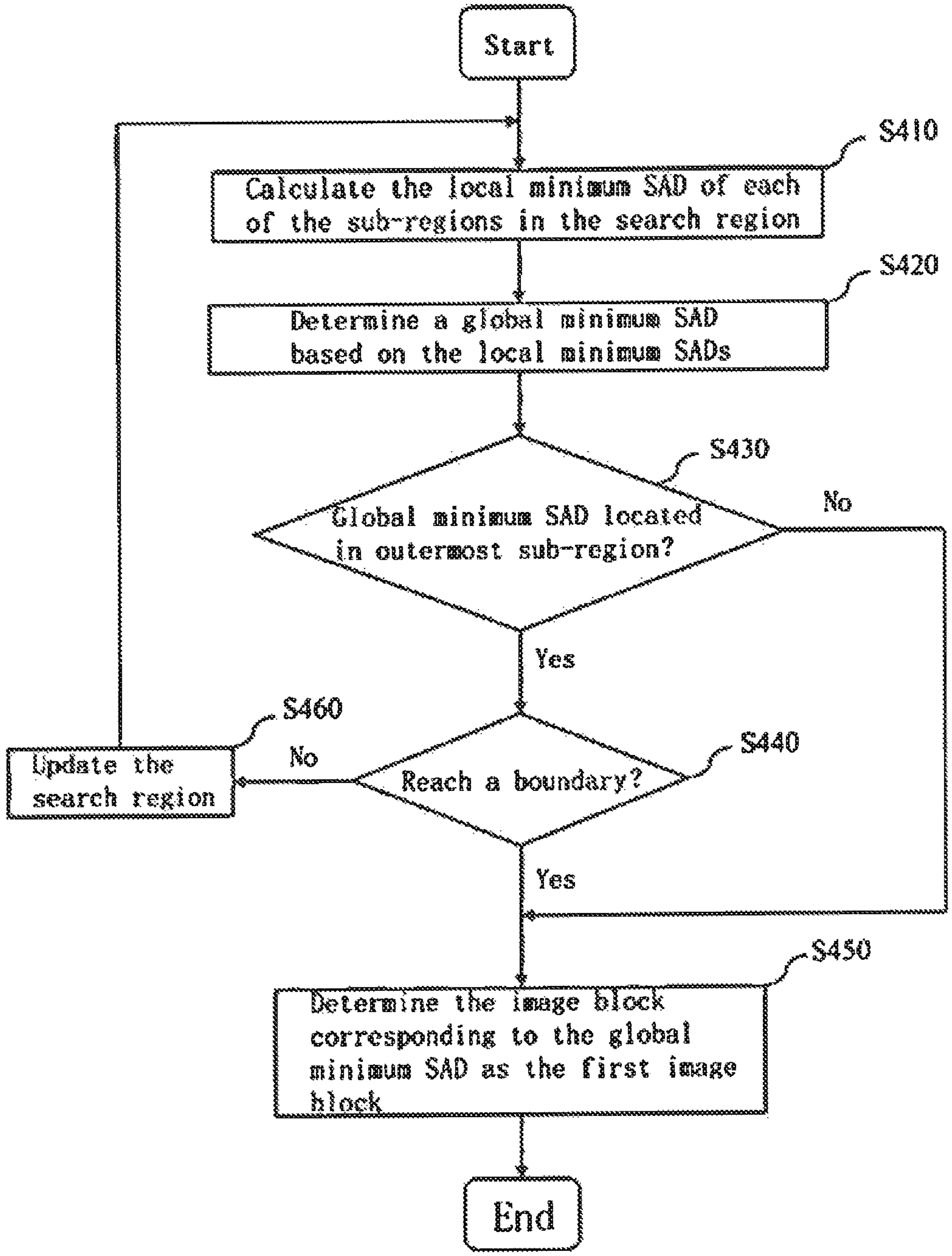

FIG. 4 illustrates a flowchart of a process of determining the first image block P based on a local minimum SAD according to example embodiments of the present disclosure. The steps in FIG. 4 may correspond to step S320 in FIG. 3.

Referring to FIG. 4, in step S410, the local minimum SAD of each of the sub-regions in the search region may be calculated, wherein the local minimum SAD of each of the sub-regions is a minimum of SADs between respective image blocks having centers located in each of the sub-regions and the template image block. According to some examples, the minimum SAD among the SADs obtained by calculating the SAD between each of the image blocks having centers located in one sub-region and the template image block is the local minimum SAD of the one sub-region.

Referring again to FIG. 5, the SAD between each of 9 image blocks centered on 9 pixels in the first sub-region and the template image block may be calculated. In some cases, the minimum S1 among the calculated SADs may be determined as the local minimum SAD of the first sub-region. Similarly, the SADs between 16 image blocks centered on 16 pixels in the second sub-region and the template image block and the SADs between 24 image blocks centered on 24 pixels in the third sub-region and the template image block may be calculated respectively, and the second local minimum SAD S2 and the third local minimum SAD S3 may be determined.

In step S420, a global minimum SAD may be determined based on local minimum SADs of the plurality of sub-regions calculated in step S410, wherein the global minimum SAD is a minimum among the plurality of local minimum SADs.

In step S430, it may be determined whether the sub-region, to which the global minimum SAD belongs, is an outermost sub-region among the sub-regions in a current search region.

For example, after obtaining three local minimum SADs (i.e., S1, S2 and S3), if the global minimum SAD is S1 or S2, the region to which the global minimum SAD belongs (i.e., first sub-region or second sub-region), is not the outermost sub-region in the search region which indicates that the SAD calculation has converged. Therefore, in step S450, the image block corresponding to the global minimum SAD may be determined as the first image block P.

For example, if the global minimum SAD is S3, the third sub-region to which the global minimum SAD belongs, is the outermost sub-region in the current search region which means that the SAD calculation has not converged and the image block whose center is outside the third sub-region may have a smaller SAD. Thus, at this time, the search region may be further expanded, that is, expanded on the basis of the search region determined in step S310 (described with reference to FIG. 3).

Referring to FIG. 4, when the sub-region, to which the global minimum SAD belongs, is the outermost sub-region in the current search region (Yes in S430), step S440 may determine whether an image block, which has a center located in the outermost sub-region, has reached a boundary of the image to be matched. If there is at least one image block that has reached the boundary of the image to be matched (YES in S440), there is no need to expand the search region. At this time, the image block corresponding to the global minimum SAD may be determined as the first image block P (S450); otherwise, the search region may be updated in step S460.

The search region may be updated by expanding outward from the current search region (e.g., the outermost region of the current search region). For example, an expansion region, which is a sub-region, may be obtained by expanding outward from the third sub-region in stride of 1 pixel and the expansion region may be an annular area located outside the third sub-region and surrounding the third sub-region. At this time, the updated search region includes the first sub-region, the second sub-region, the third sub-region, and the expansion region (e.g., referred to as a fourth sub-region). However, this is only an example, and the present disclosure is not limited thereto. The stride of obtaining the expansion region may be arbitrarily selected for image matching.

After the search region is updated, the operation may return to step S410. By repeating steps S410 to S460, the first image block P having the smallest SAD with the template image block may be obtained through limited SAD calculation (i.e., instead of scanning the entire image to be matched).

According to some example embodiments, in the above process, if the global minimum SAD is located in the outermost sub-region and the local minimum SAD of the outermost sub-region is the same as that of its adjacent sub-region, the search region may be continuously updated until the local minimum SAD of the outermost sub-region is different from that of the adjacent sub-region.

After the first image block P is determined, the image blocks around the first image block P may be checked to obtain a candidate image block based on texture information (i.e., the second image block G). Accordingly, by using texture information to obtain a candidate image block, the influence of illumination, occlusion and the like on the accuracy of image matching is reduced.

Figure 6:
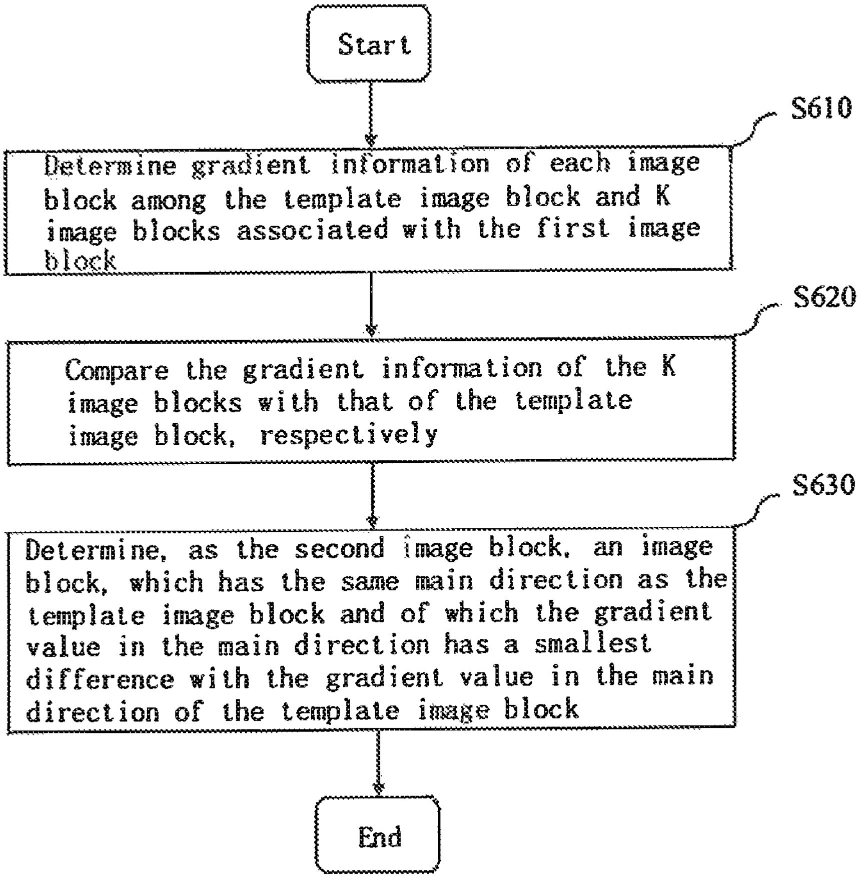
FIG. 6 is a flowchart illustrating determination of a second image block according to some example embodiments.

FIG. 6 is a flowchart illustrating determination of the second image block G according to some example embodiments. Although FIG. 6 shows various steps, the order of the steps is not necessarily limited to the order shown in FIG. 6. Steps S610 to S630 in FIG. 6 may correspond to step S240 in FIG. 2.

Referring to FIG. 6, in step S610, gradient information of each image block, among the template image block and K image blocks associated with the first image block P may be determined.

Figure 7:
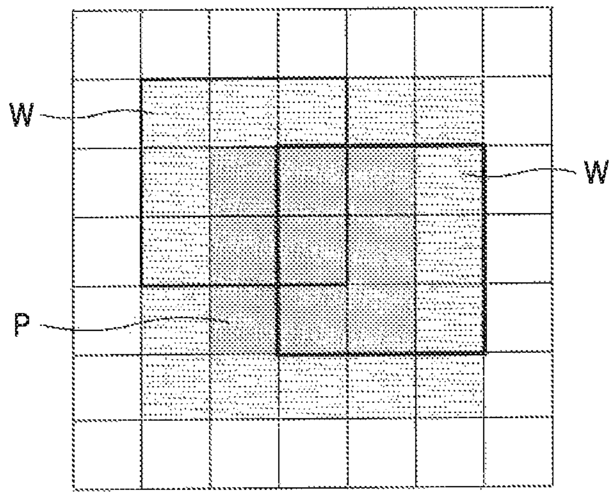
FIG. 7 is a diagram illustrating determination of K image blocks according to some example embodiments.

FIG. 7 is a diagram illustrating determination of K image blocks according to some example embodiments. Referring to FIG. 7, image blocks which are overlapped with the first image block P may be obtained based on a sliding window operation in which the matching window W slides across the first image block P. The SAD of each of the image blocks between the template image block may be calculated and the image blocks may be sorted in ascending order of the calculated SADs. Additionally, the top K image blocks may be selected as the image blocks to be checked, where K is an integer greater than 1. The value of K may be arbitrarily set. In some examples, as the value of K decreases, time taken to determine the second image block G is reduced.

According to some example embodiments, gradient information may include a main direction of an image block and a gradient value in the main direction.

In some cases, a convolution process may be used to obtain gradient information of image blocks. Convolution may reduce the influence of noise. For example, multiple convolution kernels may be used to calculate the gradient values in multiple directions (e.g., horizontal direction, vertical direction, diagonal direction, and backslash direction) of the image block, and the direction in which the gradient value (e.g., absolute value) is maximum may be determined as the main direction of the image block. Therefore, the main directions of respective image blocks may be different.

In step S620, the gradient information of K image blocks may be compared with the gradient information of the template image block, respectively. For example, the main directions of K image blocks may be compared with the main direction of template image blocks. Additionally, differences between the gradient values in the main direction of K image blocks and the gradient value in the main direction of template image blocks may be calculated.

In step S630, an image block, which has the same main direction as the template image block and of which the gradient value in the main direction has a smallest difference with the gradient value in the main direction of the template image block, among the K image blocks, may be determined as the second image block G.

After the candidate image block based on SAD information (i.e., the first image block P) and the candidate image block based on texture information (i.e., the second image block G) are determined, the matching image block T may be finally determined based on the two candidate image blocks.

Figure 8:
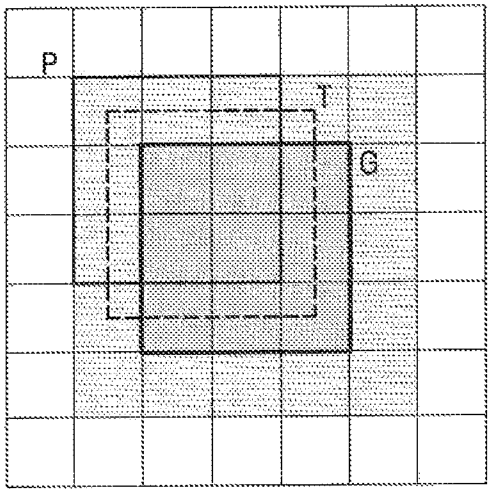
FIG. 8 is a diagram of determination of matching image blocks according to some example embodiments.

FIG. 8 illustrates a diagram of determining matching image blocks according to some example embodiments.

When the first image block P and the second image block G are a same image block, the first image block P or the second image block G may be determined as the matching image block T.

When the first image block P and the second image block G are not the same image block, a position of the matching image block T may be determined based on a position of the first image block P, a position of the second image block G, and a gradient difference change rate w.

According to some example embodiments, a difference between gradient values in the main direction of the template image block of each two image blocks from among the first image block P and the K image blocks (i.e. among a group including the first image block P and the K image blocks) may be calculated. A maximum gmax and a minimum gmin among the calculated differences between the gradient values may be determined. The gradient difference change rate ω may be calculated based on the gmax and the gmin. For example, the gradient difference change rate ω may be calculated based on equation (1). However, the present disclosure is not limited thereto.

$$\omega = \frac{gmax - gmin}{gmax} \quad (1)$$

The gradient difference change rate ω may reflect texture information of the image block. As ω increases, the texture of regions around the first image block P is high. Accordingly, at this time, the matching image block T may tend to approach the second image block G with the smallest gradient information difference. On the contrary, as ω decreases, the texture of regions around the first image block P is low. Accordingly, at this time, the matching image block T may tend to approach the first image block P with the smallest SAD.

According to an embodiment, the position of the matching image block T may be determined based on a weighted sum of the position of the first image block P and a position of the second image block G, and the weights used in calculation of the weighted sum may be associated with the gradient difference change rate ω.

For example, a position coordinate of a center of an image block may be used to represent the position of the image block. Assuming that the position coordinates of the center of the first image block P are (P_x, P_y) and the position coordinates of the center of the second image block G are (G_x, G_y), the position (T_x, T_y) of the matching image block T may be obtained based on equations (2) and (3):

$$T\_x = \alpha P\_x + (1 - \alpha) G\_x \quad (2)$$

$$T\_y = \beta P\_y + (1 - \beta) G\_y \quad (3)$$

In equations (2) and (3), α and β indicate weights, where $0 \le \alpha \le 1$, and $0 \le \beta \le 1$. The values of α and β may be associated with the gradient difference change rate ω. As the gradient difference change rate ω increases, values of α and β decrease.

Figure 9:
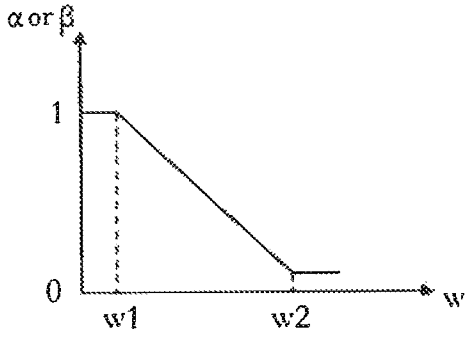
FIG. 9 is a diagram of relationship between weights and gradient difference change rate according to some example embodiments.

FIG. 9 illustrates a diagram of example of a relationship between weights α and β and gradient difference change rate ω according to some example embodiments.

Referring to FIG. 9, when the gradient difference change rate ω is less than or equal to the first threshold ω1, both α and β may be set to 1. At this time, the first image block P may be determined as the matching image block T due to low textures. When the gradient difference change rate ω is greater than or equal to the second threshold ω2, both α and β may be set to 0.2. At this time, due to high textures, the matching image block T is closer to the second image block G. However, the second image block G still cannot be determined as the matching image block T. That is, even if the gradient difference change rate ω is high, SAD information is still considered.

For example, the first threshold ω1 may be 0.1 and the second threshold ω2 may be 0.8. However, this is only an example, and the present disclosure is not limited thereto. The first threshold ω1 and the second threshold ω2 may be variously set as needed.

According to the image matching method of some embodiments of the present disclosure, the matching image block may be determined by considering both the SAD information and gradient difference information (or texture information), thereby the influence of illumination, occlusion and the like on image matching may be reduced, and accuracy and robustness of image matching may be improved. The generalization ability of image matching algorithm to different scenes may be improved effectively by determination of whether the image block is a high-texture region or a low-texture region using the gradient difference information and adjusting the position of the matching image block accordingly.

Additionally, the SAD calculation is performed on only a part of image blocks (i.e., partial image blocks) using the correlation between the reference image and the image to be matched. Therefore, the calculation amount is significantly reduced compared with the SAD calculation that scans the entire image. Additionally, when calculating the gradient information, the computations may be further reduced and the image matching speed may be improved by performing the calculation of the gradient information on a part of the image blocks around the first image block P.

Figure 10:
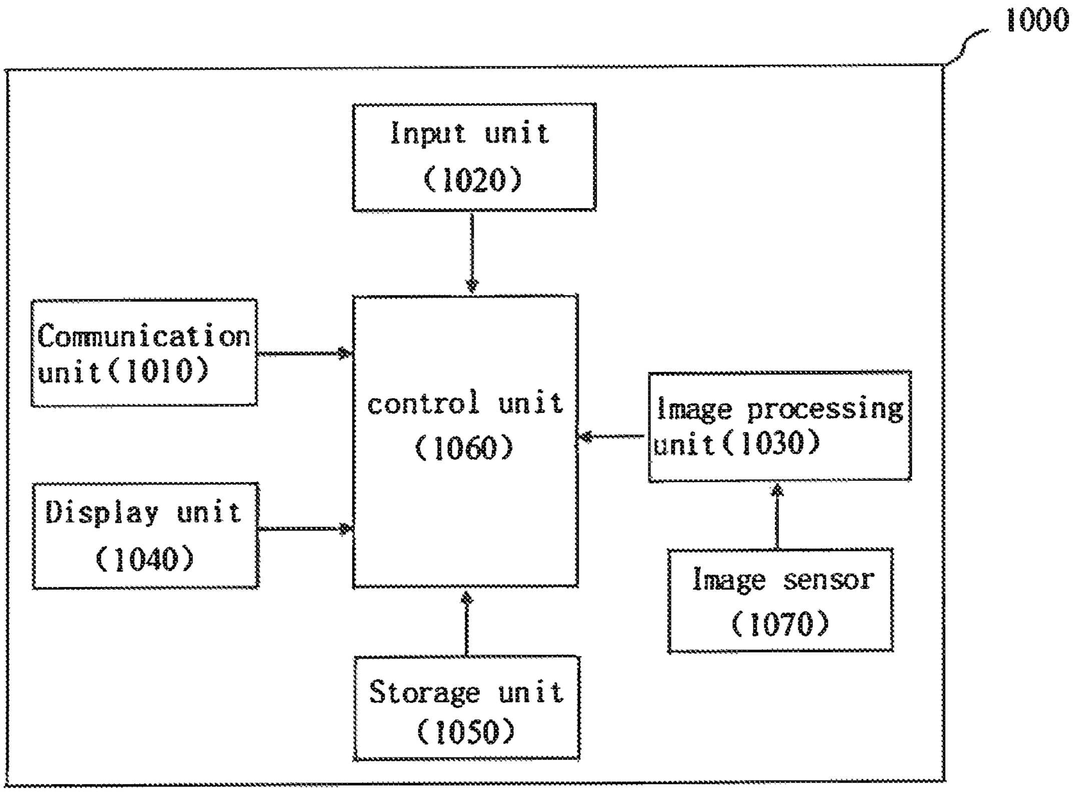
FIG. 10 is a block diagram of a mobile terminal according to some example embodiments.

FIG. 10 illustrates a block diagram of a mobile terminal according to some example embodiments.

As shown in FIG. 10, the mobile terminal 1000 according to some example embodiments includes a communication unit 1010, an input unit 1020, an image processing unit 1030, a display unit 1040, a storage unit 1050, a control unit 1060, and an image sensor 1070.

The communication unit 1010 may perform a communication operation of the mobile terminal. The communication unit 1010 may establish a communication channel with the communication network and/or may perform communication associated with, for example, a voice call, a video call, and/or a data call.

The input unit 1020 is configured to receive various input information and various control signals and to transmit the input information and control signals to the control unit 1060. The input unit 1020 may be implemented based on various input devices such as keypads and/or key boards, touch screens and/or styluses, mouse, etc. However, example embodiments are not limited thereto.

The image processing unit 1030 is connected to the image sensor 1070. The image sensor 1070 may capture images and transmit the captured images to the image processing unit 1030. The image processing unit 1030 performs image processing on the images (e.g., using the image matching method illustrated in FIG. 2) and transmits the image matching result to the control unit 1060. The control unit 1060 may transmit the image matching result via the communication unit 1010 and/or may store the image matching result in the storage unit 1050. The image processing unit 1030 may be similar to the image processor 120 of FIG. 1.

The display unit 1040 is used to display various information and may be implemented, for example, using a touch screen. However, example embodiments are not limited thereto.

The storage unit 1050 may include volatile memory and/or nonvolatile memory. The storage unit 1050 may store various data generated and used by the mobile terminal. For example, the storage unit 1050 may store an operating system (OS) and applications (e.g. applications associated with the method of the present disclosure) for controlling the operation of the mobile terminal. The control unit 1060 may control the overall operation of the mobile terminal and may control part or all of the internal elements of the mobile terminal. The control unit 1060 may be implemented as general-purpose processor, application processor (AP), application specific integrated circuit, field programmable gate array, etc., but example embodiments are not limited thereto.

In some example embodiments, the image processing unit 1030 and the control unit 1060 may be implemented by the same device and/or integrated in a single chip.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers.

A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller.

One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described are written as computer programs, code segments, instructions or any combination thereof, for individually or collectively instructing or configuring the processor or computer to operate as a machine or special-purpose computer to perform the operations performed by the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While various example embodiments have been described, it will be apparent to one of ordinary skill in the art that various changes in form and details may be made in these examples without departing from the spirit and scope of the claims and their equivalents.

What is claimed is:

1. A method of image matching comprising:

obtaining a reference image and an image to be matched;

determining a template image block in the reference image, wherein the template image block is an image block located in a matching window in the reference image;

determining a first image block in the image to be matched, wherein the first image block is an image block from the image to be matched having a smallest sum of an absolute difference (SAD) with the template image block;

determining a second image block in the image to be matched, wherein the second image block is an image block from the image to be matched having a smallest gradient information difference with the template image block, wherein the determining the second image block comprises: determining gradient information for the template image block and each of K image blocks associated with the first image block, respectively, wherein the gradient information comprises a main direction of the image block and a gradient value in the main direction, wherein K is an integer greater than 1, and wherein the main direction of the image block comprises a direction of a maximum gradient value among gradient values in a plurality of directions; comparing the gradient information of each of the K image blocks with that of the template image block, respectively; and determining, as the second image block, an image block having a same main direction as the template image block and for which the gradient value in the main direction has a smallest difference with the gradient value in the main direction of the template image block among the K image blocks, wherein the K image blocks comprise a set of K top image blocks among a set of image blocks overlapping the first image block, wherein the K image blocks are sorted in ascending order of the SAD with the template image block, and wherein the set of image blocks overlapping the first image block are obtained by sliding the matching window across the first image block; and determining a matching image block in the image to be matched based on the first image block and the second image block.

2. The method of claim 1, wherein determining the matching image block comprises:

determining the first image block or the second image block as the matching image block based on the first image block and the second image block being a same image block.

3. The method of claim 1, wherein determining the matching image block comprises:

determining a position of the matching image block based on a position of the first image block, a position of the second image block, and a gradient difference change rate, based on the first image block and the second image block being different image blocks;

wherein the matching image block is closer to the second image block as the gradient difference change rate increases;

wherein the matching image block is closer to the first image block as the gradient difference change rate decreases; and wherein the first image block is determined as the matching image block when the gradient difference change rate is less than a predetermined threshold.

4. The method of claim 3, wherein the position of the matching image block is determined based on a weighted sum of the position of the first image block and the position of the second image block, and weights used in calculation of the weighted sum are associated with the gradient difference change rate.

5. The method of claim 4, wherein as the gradient difference change rate increases, a weight corresponding to the position of the first image block is smaller, and a weight corresponding to the position of the second image block is greater.

6. The method of claim 3, wherein the determining the gradient difference change rate comprises:

calculating a difference between gradient values in a main direction of the template image block for a pair of image blocks from among the K image blocks and the first image block; and calculating the gradient difference change rate based on a maximum and a minimum of the calculated differences between the gradient values.

7. The method of claim 1, wherein the determining the first image block comprises determining the first image block by calculating SAD values between the template image block and a partial image block in the image to be matched, wherein a center of the partial image block is located in a search region in the image to be matched and the search region is associated with a position of the template image block in the reference image.

8. The method of claim 7, wherein the determining the first image block comprises:
determining the search region from the image to be matched;
determining the first image block based on a local minimum SAD of each of a plurality of sub-regions in the search region, wherein the local minimum SAD of each of the plurality of sub-regions is a minimum of the SAD values between image blocks having centers located in each of the plurality of sub-regions and the template image block, respectively.

9. The method of claim 8, wherein the determining the first image block based on the local minimum SAD of each of the sub-regions in the search region comprises:
calculating the local minimum SAD of each of the plurality of sub-regions;
determining a global minimum SAD based on the local minimum SADs, wherein the global minimum SAD is a minimum among the local minimum SADs;
determining whether a sub-region comprising the global minimum SAD is an outermost sub-region among the plurality of sub-regions in a current search region; and
determining an image block corresponding to the global minimum SAD as the first image block when the sub-region comprising the global minimum SAD is not the outermost sub-region.

10. The method of claim 9, further comprising:
updating the search region when the sub-region comprising the global minimum SAD is the outermost sub-region, and then determining the first image block based on the local minimum SAD of each of the plurality of sub-regions in the search region based on the updating,
wherein the updated search region further comprises an expansion region which is a sub-region located outside and surrounding the outermost sub-region.

11. The method of claim 10, further comprising:
determining an image block that has a center located in the outermost sub-region and that reaches a boundary of the image to be matched before updating the search region; and
determining the image block corresponding to the global minimum SAD as the first image block in response to at least one image block which has the center located in the outermost sub-region and reaches a boundary of the image to be matched.

12. The method of claim 8,
wherein the determined search region comprises a plurality of sub-regions sequentially embedded from inside to outside, and
wherein a first sub-region, which is innermost among the plurality of sub-regions, is located in a region in the image to be matched corresponding to the position of the template image block in the reference image and a size of the first sub-region is same as that of the matching window.

13. An image processing device comprising:
a memory; and
a processor configured to:
obtain a reference image and an image to be matched;
determine a template image block in the reference image, wherein the template image block is an image block located in a matching window in the reference image;
determine a first image block in the image to be matched, wherein the first image block is an image block from the image to be matched having a smallest sum of an absolute difference (SAD) with the template image block;
determine a second image block in the image to be matched, wherein the second image block is an image block from the image to be matched having a smallest gradient information difference with the template image block,
wherein the processor is configured to determine the second image block by: determining gradient information for the template image block and each of K image blocks associated with the first image block, respectively, wherein the gradient information comprises a main direction of the image block and a gradient value in the main direction, wherein K is an integer greater than 1, and wherein the main direction of the image block comprises a direction of a maximum gradient value among gradient values in a plurality of directions; comparing the gradient information of each of the K image blocks with that of the template image block, respectively; and determining, as the second image block, an image block having a same main direction as the template image block and for which the gradient value in the main direction has a smallest difference with the gradient value in the main direction of the template image block among the K image blocks, wherein the K image blocks comprise a set of K top image blocks among a set of image blocks overlapping the first image block, wherein the K image blocks are sorted in ascending order of the SAD with the template image block, and wherein the set of image blocks overlapping the first image block are obtained by sliding the matching window across the first image block; and
determine a matching image block in the image to be matched based on the first image block and the second image block.

14. The image processing device of claim 13, wherein the processor is configured to,
determine the first image block or the second image block as the matching image block based on the first image block and the second image block being a same image block; and
determine a position of the matching image block based on a position of the first image block, a position of the second image block, and a gradient difference change rate, based on the first image block and the second image block being different image blocks.

15. The image processing device of claim 13, wherein the processor is configured to,
determine the first image block by calculating SAD values between the template image block and a partial image block in the image to be matched,
wherein a center of the partial image block is located in a search region in the image to be matched and the search region is associated with a position of the template image block in the reference image.

16. A non-transitory computer-readable storage medium storing instructions that, when executed by a processor, cause the processor to:
obtain a reference image and an image to be matched;
determine a template image block in the reference image, wherein the template image block is an image block located in a matching window in the reference image;
determine a first image block in the image to be matched, wherein the first image block is an image block from the image to be matched having a smallest sum of an absolute difference (SAD) with the template image block;

determine a second image block in the image to be matched, wherein the second image block is an image block from the image to be matched having a smallest gradient information difference with the template image block, wherein the instructions, when executed by the processor, cause the processor to determine the second image block by: determining gradient information for the template image block and each of K image blocks associated with the first image block, respectively, wherein the gradient information comprises a main direction of the image block and a gradient value in the main direction, wherein K is an integer greater than 1, and wherein the main direction of the image block comprises a direction of a maximum gradient value among gradient values in a plurality of directions; comparing the gradient information of each of the K image blocks with that of the template image block, respectively; and determining, as the second image block, an image block having a same main direction as the template image block and for which the gradient value in the main direction has a smallest difference with the gradient value in the main direction of the template image block among the K image blocks, wherein the K image blocks comprise a set of K top image blocks among a set of image blocks overlapping the first image block, wherein the K image blocks are sorted in ascending order of the SAD with the template image block, and wherein the set of image blocks overlapping the first image block are obtained by sliding the matching window across the first image block; and determine a matching image block in the image to be matched based on the first image block and the second image block.

* * * * *